United States Patent [19]

Bullivant

[11] Patent Number: 5,775,532
[45] Date of Patent: Jul. 7, 1998

[54] AUTOMATIC CALIBRATION PROCESS AND APPARATUS FOR MATERIALS FEEDING

[76] Inventor: Kenneth Walter Bullivant, 3 Camly La., Chadds Ford, Pa. 19317

[21] Appl. No.: 617,064

[22] Filed: Mar. 18, 1996

[51] Int. Cl.$^6$ ............................................. B67B 7/00
[52] U.S. Cl. .................... 222/1; 222/55; 222/370; 73/1.36; 73/863.55
[58] Field of Search ............... 222/55, 345, 370, 222/564, 1, 77; 73/1.36, 1.74, 863.44, 863.53, 863.54, 863.55

[56] References Cited

U.S. PATENT DOCUMENTS

| | | | |
|---|---|---|---|
| Re. 35,010 | 8/1995 | Price | 222/1 |
| 3,751,991 | 8/1973 | Fisher et al. | 73/863.44 X |
| 3,945,532 | 3/1976 | Marks | 222/55 |
| 4,069,948 | 1/1978 | Saaty et al. | 73/1.36 X |
| 4,528,848 | 7/1985 | Hafner | 222/370 X |
| 4,667,503 | 5/1987 | Loos | 73/1.36 X |
| 5,454,524 | 10/1995 | Bullivant et al. | |

*Primary Examiner*—Gregory L. Huson
*Attorney, Agent, or Firm*—Huntley & Associates

[57] ABSTRACT

In a system consisting of utilization equipment receiving material from a blending apparatus, the blending apparatus receiving at least two component ingredients from at least one feeding apparatus and passing the blended mix to the utilization equipment, a process and apparatus for automatic, periodic, intermittent calibration of the feeding apparatus while the utilization equipment continues to operate.

17 Claims, 6 Drawing Sheets

AUTOMATIC CALIBRATION PROCESS AND APPARATUS FOR MATERIALS FEEDING

BACKGROUND OF THE INVENTION

The present invention relates generally to a materials feeding apparatus which delivers controlled amounts of free flowing solid materials to utilization equipment. More specifically, the present invention relates to a process and apparatus for self calibration of a materials feeding apparatus.

Generally, a materials feeding apparatus ("feeder") utilizes a variable speed motor driven metering element such as an auger or a disc having pockets or perforations to segregate quantities of material, the quantities corresponding to the pockets or perforations of the disc, and dispenses each quantity for eventual consumption by the utilization equipment. Typically, to minimize variations between each quantity of material, a baffle is positioned to skim excess material from the metering element, and each quantity is subsequently dispensed through a discharge port, by way of a chute or funnel positioned below the metering element and baffle, to a blending apparatus for eventual consumption by the utilization equipment. The variable speed motor is typically digitally controlled, providing an accurate means of maintaining a desired rate of operation, or changing the rate of operation of the feeder. The configuration and size of the metering element determines the amount of material dispensed per unit of operation of the feeder. For example, if the metering element is an auger, one revolution of the auger equals one unit of operation, and in the case of a disc metering element, each pocket on the perimeter of the disc equals one unit of operation. Thus in a feeder utilizing a disc metering element, one revolution of the disc is comprised of an integral number of incremental units of operation. The operational speed of the motor drive and the amount of material dispensed per unit of operation determine the amount of material dispensed by the feeder over time.

Typically, the material consumed by the utilization equipment consists of different components, at least partially blended or mixed prior to consumption by the utilization equipment. To assure a consistent final product, the utilization equipment must receive the components in precisely controlled amounts, so that the ratio of components comprising the material remains constant. As a result of this requirement, each component is usually dispensed in controlled amounts by a feeding apparatus. Where there are only two component ingredients, there may only be one feeding apparatus to dispense one component, in controlled amounts determined by the desired component ratio of the material to be consumed, and at a rate necessary to maintain that desired ratio. Generally, there may be a separate feeding apparatus for each component introduced into the utilization equipment.

Previous methods of determining and maintaining the desired component ratio involved initial calibration and repeated, periodic calibration of a volumetric feeder. The initial calibration of the feeder involved establishing the total rate of material consumption by the utilization equipment, and determining the rate of consumption for each component based on the desired ingredient ratios. From the rate of consumption of each component by the utilization equipment, the correct operational speed of the feeder could be determined, based on the amount of component dispensed per unit of operation, to assure that the utilization equipment consistently received the correct blend of component ingredients.

More specifically, calibration involved first determining the percentage, as a portion of the whole, of each component necessary to yield the desired blended material. Second, the total weight of material consumed by the utilization equipment over time must be determined. Third, from the previous steps, the rate of consumption of each component is calculated. Fourth, given a known rate of operation of a feeding apparatus, the rate at which the component is dispensed by the feeding apparatus is determined. Fifth, the rate of operation of the feeder is adjusted so that the feeder dispenses component at the rate necessary to maintain the correct ingredient ratio given the consumption demands of the utilization equipment.

After a period of operation, each feeder should be recalibrated to assure accurate component utilization and reduce unwanted fluctuations in the rate at which the component is dispensed by the feeding apparatus and subsequently consumed by the utilization equipment. Recalibrating each feeding apparatus involves obtaining a sample of the component dispensed by the feeder over a determined period of time, weighing the sample, calculating the actual rate at which the component is being dispensed by the feeder, and adjusting the rate of operation of the feeder so the feeder dispenses the component at the rate required to maintain the desired blend in accordance with the demands for the blend from the utilization equipment.

Unfortunately, recalibration after initial operation requires suspension of the operation of the feeder. Because the time required to recalibrate the feeder is extensive, the operation of the utilization equipment must also be suspended during recalibration. Recalibration requires that a calibration sample be taken to determine the rate at which the component is being dispensed by the feeder into the utilization equipment. This sample must be large enough to compensate for cyclical variations in the rate at which the component is dispensed by the feeder and component bulk density variations over time, and thus will likely require extensive periods of time to gather. The sample must also be large enough to assure accurate weighing in an industrial environment. In addition, the time required to gather a sample for calibration includes the time for an operator to stop the feeder, stop the utilization equipment, run the feeder to gather a calibration sample, weigh the sample, calculate the rate at which the component is being dispensed, adjust the rate of operation of the feeder, then restart both the feeder and the utilization equipment.

Previous methods of feeder recalibration have not addressed the issue of time, and consequently, there is a need for a method and means of feeder calibration and recalibration that do not require manual operation or extensive periods of time, and so that calibration and recalibration can be accomplished without interrupting the utilization process.

SUMMARY OF THE INVENTION

The present invention satisfies the need for a method and means for feeder calibration and recalibration without requiring manual operation, extensive periods of time, and without interrupting the operation of the utilization equipment, by providing a process and apparatus for automatic self-calibration of a feeding apparatus during the continued operation of the utilization equipment.

Specifically, the instant invention provides, in a process for admixing, at a predetermined ratio, at least two components in a blending apparatus, the blending apparatus being operatively connected to and receiving component from at least one feeding apparatus at a determined rate and passing the resulting blend to utilization equipment, the improvement comprising automatic, intermittent, periodic calibration of the feeding apparatus while the utilization equipment continues to operate by defining integral units of operation of the feeding apparatus; determining the time periods during which the feeding apparatus is not required to dispense its component, during which periods the utilization equipment continues to operate; diverting, in integral increments corresponding to the integral units of operation, quantities of component to a collection vessel, the diversion occurring during the time periods determined above; collecting the diverted component until it is at least equal to a predetermined minimum weight required for accurate measurement; weighing the diverted component; calculating the amount by weight of diverted component dispensed by the feeding apparatus per integral unit of operation, and determining, from the known rate of operation of the feeding apparatus, the rate at which the component is being dispensed by the feeder, in terms of amount by weight over time, and; adjusting the rate of operation of the feeding apparatus so that the component is dispensed by the feeding apparatus at the rate required to maintain the predetermined ratio, given the rate of consumption of the particular utilization equipment.

In addition, the present invention further provides, in an apparatus for admixing, at a predetermined ratio, at least two components in a blending apparatus, the blending apparatus being operatively connected to and receiving component from at least one feeding apparatus at a determined rate and passing the resulting blend to utilization equipment, the improvement for automatic, intermittent, periodic calibration of the feeding apparatus while the utilization equipment continues to operate comprising means for defining integral units of operation of the feeding apparatus; means for determining the time periods during which the feeding apparatus is not required to dispense its component, during which periods the utilization equipment continues to operate; means for diverting, in integral increments corresponding to the integral units of operation, quantities of component to a collection vessel, the diversion occurring during the time periods determined above; means for collecting the diverted component until it is at least equal to a predetermined minimum weight required for accurate measurement; means for weighing the diverted component; means for calculating the amount by weight of diverted component dispensed by the feeding apparatus per integral unit of operation, and determining, from the known rate of operation of the feeding apparatus, the rate at which the component is being dispensed by the feeder, in terms of amount by weight over time, and; means for adjusting the rate of operation of the feeding apparatus so that the component is dispensed by the feeding apparatus at the rate required to maintain the predetermined ratio, given the rate of consumption of the particular utilization equipment.

DETAILED DESCRIPTION OF THE INVENTION

The process of the present invention, using widely known and generally accepted general calibration calculations, automatically, periodically, intermittently, and incrementally recalibrates a feeding apparatus without interrupting the utilization equipment. Variations and modifications of both the generic calibration calculations and the recalibration process of the present invention are dependent on the materials, equipment, and desired final product. Accordingly, modifications in determining the variables necessary for calibration and variations in the process of the present invention can be made without departing from the principles of the invention, as will be evident to those skilled in the art.

The general calculations necessary for initial calibration of a feeder, while not central to the present invention, are independently determined for each component and each feeder, and these calculations are as follows: (1) determining a ratio of components necessary to yield the desired blended material, (2) determining the rate at which the blended material is consumed by the utilization equipment, (3) determining the rate each component is consumed by the utilization equipment, (4) determining the rate the component is dispensed by the feeder, and (5) adjusting the rate at which the component is dispensed by the feeder to conform to the rate the component is consumed by the utilization equipment, or (5A) adjusting the rate at which the component is dispensed by the feeder so that the it is dispensed at the rate required to maintain the correct blend ratio, given the rate of consumption by the utilization equipment.

Calibration and recalibration according to the present invention provides a process to automatically determine the rate a component is being dispensed by the feeder periodically, intermittently, and incrementally while the utilization equipment is in operation, so the rate of operation of the feeder can be adjusted so that the component is dispensed at the necessary rate required to maintain the correct blend ratio, given the consumption demands of the utilization equipment. The process is detailed below, and can be preprogrammed to occur automatically. The process of the present invention will be described in detail for a system comprising a rotary volumetric feeder, specifically a disc feeder, operatively connected to a collection blender, the blender being connected to extrusion utilization equipment.

In the system described above, the process of the present invention involves the following steps: Material is consumed by extrusion utilization equipment at a constant rate, and this rate can be easily determined. Because the rate of material consumption is constant, and because the ratio of components comprising the material is constant, the rate each component is consumed by the utilization equipment must also be constant. To insure that the utilization equipment is constantly supplied with material, each component must be dispensed at a rate greater than the maximum expected rate of its consumption. As a result of this requirement, the collection blender is typically a surge hopper included in the system to store enough of each component, at the correct ratios, for consumption. The surge hopper typically has high and low level sensors, which automatically stop the flow of each component into the hopper when the blended components reach the high level, and restart the flow when the component materials reach the low level.

During the time that elapses when the surge hopper is between the high and low levels the utilization equipment continues to operate and consume the blended material, but each feeder is temporarily inactive. These time periods, while generally insufficient to complete a manual calibration of the feeder according to previous methods, are sufficient to accomplish an incremental portion of the calibration process of the present invention. Each periodic, temporary cessation of feeder operation discussed above can provide the necessary time for the process of the present invention to automatically divert a quantity of a component, in increments equal to at least one integral unit of operation of the feeder, collect the diverted component, weigh the sum total of each increment of diverted component, and calculate the amount by weight of component dispensed by the feeder per integral unit of operation. Because most feeders comprise digitally controlled drive motors, the rate of operation of the feeder is known. From the amount dispensed per integral unit of operation and the known rate of operation of the feeder, the rate a component is dispensed into the blender can be accurately determined and controlled so that the correct ratio of components in the blender can be maintained, thus insuring that the utilization equipment always receives the correct blend of components from the blender as those components are needed for utilization.

As a second example, the process of the present invention, as detailed below, is based on a system comprising a rotary volumetric feeder, specifically a disc feeder, operatively connected to a static blender, the blender being connected to injection molding utilization equipment.

Injection molding utilization equipment typically consumes material in pulses or intermittently as quantities of material are injected into individual molds. In between each injection of material into a mold, the injection molding equipment typically draws blended material from the blender in preparation for the next injection. This period is called the screw recovery time, as the injection screw is recovering to a ready to inject position. While injecting the material into a mold, and during the holding period following injection, the equipment is not drawing material from the blender, and these periodic pauses in the demand for material provide the opportunity for the process of the present invention to automatically divert a quantity of a component, in increments corresponding to integral units of operation of the feeder, to the calibration process of the present invention. Over time, each periodically diverted sample of the component is collected, until it exceeds a predetermined amount by weight, and is then weighed. The weight of the diverted sample of component is divided by the amount of integral units of operation of the feeding apparatus required to divert it, resulting in an amount by weight of the component dispensed per integral unit of operation of the feeder. Given the known, digitally controlled rate of operation of the feeder, the process determines whether the component is being dispensed at the rate required to maintain the correct blend ratio, given the demands of the utilization equipment. The process then automatically adjusts the rate of operation of the feeder so that the component is dispensed at the rate required to maintain the blend ratio.

As a third example, the process of the present invention, as detailed below, is based on a system comprising two rotary disc feeders, one for each component, operatively connected to a surge hopper, the surge hopper being connected to injection molding utilization equipment.

Because injection molding utilization equipment consumes material in pulses as described above, each rotary disc feeder will dispense its component at a rate higher than the average rate of consumption of that component by the utilization equipment to insure that the equipment always receives the blended components. Accordingly, a surge hopper having high and low level sensing means to determine when material fed into the hopper has reached a determined high or low level is necessary in such a configuration. Each feeder is activated when the level of material in the surge hopper reaches the low level, and each is stopped when the material reaches the high level. The time during which the material in the hopper has reached the high level and is being depleted by the utilization equipment, during which the feeders have stopped feeding component into the surge hopper, is the time available for diversion of each component for calibration according to the process of the present invention.

Regardless of the type of utilization equipment, the time available for diversion of a component according to the process of the present invention generally includes the time to stop the operation of the feeding apparatus, the time for all of the component to fall from the feeding apparatus and into the blending apparatus, the time to move the diversion means to a position to deliver the component to the collection vessel, the time to operate the feeding apparatus for at least one integral unit of operation, the time to stop the operation of the feeding apparatus, the time for the diverted component to fall into the collection vessel, and the time for the diversion means to return to its original position. Generally, the diversion is limited to intermittent pauses in the operation of the feeding apparatus that are greater than the time required for the diversion of at least one integral amount of the component.

According to the present invention and based on generic calibration calculations, the rate of operation of any feeding apparatus can be periodically calculated and adjusted accordingly, so the component is dispensed by the feeder at the rate required to yield the desired product, without interrupting the operation of the utilization equipment. The present invention thus provides a process and means for automatic calibration of a feeding apparatus during operation of the utilization equipment without reducing the overall output of the utilization equipment over a given period of time.

While the process of the present invention provides more advantages when implemented during the operation of the utilization equipment, it can also be implemented when the utilization equipment is dormant. Similarly, the apparatus of the present invention provides a means of automatic intermittent calibration of a feeder during the operation of the utilization equipment, and also provides a means of calibrating the feeder when the utilization equipment is not operating. The process and apparatus can also be used, while the utilization equipment is dormant, to determine feeder calibration for a new component of unknown density.

The apparatus of the present invention will be more fully understood by reference to the drawings. In these figures, like numbers refer to like elements. Although the drawings show specific embodiments of an apparatus of the present invention, variations and modifications can be substituted without departing from the principles of the invention, as will be evident to those skilled in the art.

Figure 1:
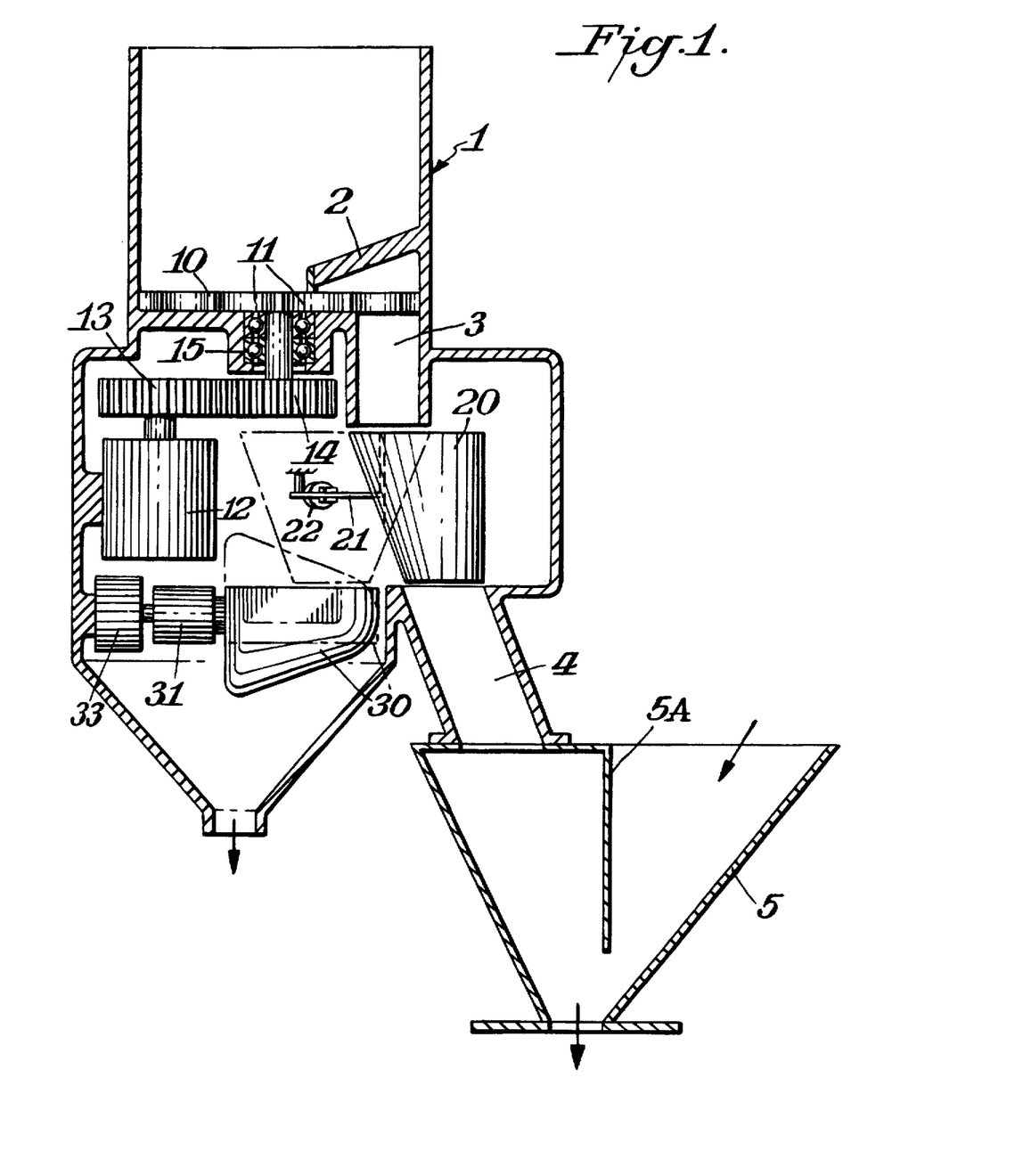
FIG. 1 is a schematic cross sectional view of a feeding apparatus of the present invention showing a disc metering element, a collection vessel, and a diverter chute of the apparatus.

FIG. 1 is a schematic cross sectional view of a feeding apparatus of the present invention. The Figure is schematic to the extent that the discharge port, diverter chute, and blender chute have been placed in the same plane as the cross section for illustration purposes and clarity. In FIG. 1, a component is introduced into the feeder 1, where it settles into the pockets 11 located along the perimeter of the disc metering element 10. A disc drive motor 12 is connected to the disc by drive shaft 15, and drive gears 13, and 14. The motor causes the disc to rotate, and a disc baffle 2 skims component, maintaining a consistent volumetric amount of component in each pocket. As the disc rotates, each pocket, after passing under the baffle, moves towards discharge port 3, where each integral quantity of component within the pocket falls into the diverter chute 20. The disc baffle, in addition to decreasing variations in the amount of component in each pocket, also prevents unmeasured amounts of component from falling through the discharge port.

As each quantity of component falls through the discharge port, it passes into the receiving aperture at the top of the chute, and falls through the tapered portion of the chute and through the smaller dispensing aperture of the chute. From the dispensing aperture, the component is conveyed, through a blender chute 4, and into a blending apparatus 5.

The blending apparatus shown in FIG. 1 has a blending baffle 5A to insure that component received from the feeder is mixed at the correct ratio, with another component which is flood fed into the blending apparatus, before the resulting blended mix is consumed by the utilization equipment, not shown. In FIG. 1, the blending apparatus feeds the resulting blended mix of components to injection molding utilization equipment, also not shown.

Figure 2:
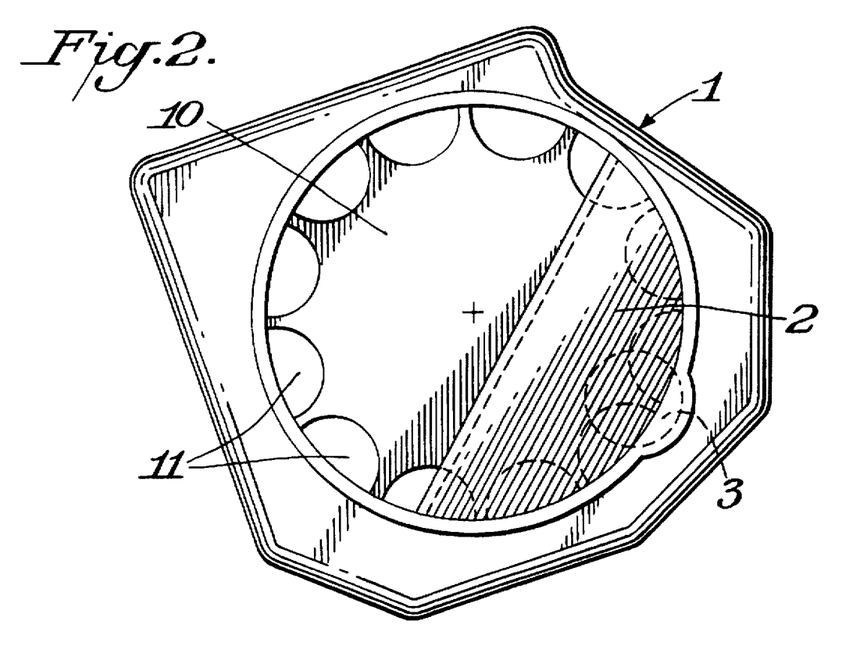
FIG. 2 is a top plan view of a feeding apparatus of the present invention, showing a disc metering element of an apparatus of the invention.
Figure 3:
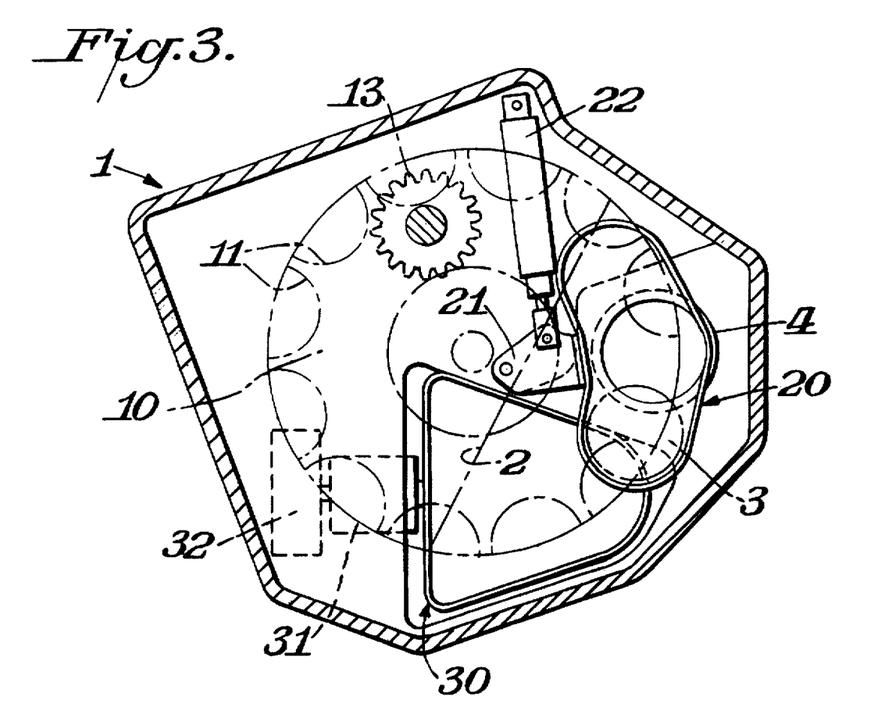
FIG. 3 is a top plan view of an embodiment of a feeding apparatus, showing the disc metering element in phantom, and a preferred collection vessel and diverter chute of the present invention.

FIG. 2, a top plan view of an apparatus of the present invention, shows a disc 10 having pockets 11, a disc baffle 2, and a discharge port 3 drawn in phantom below the disc baffle. In FIG. 3, a top plan view of an apparatus of the invention, the disc 10 and disc baffle 2 are shown in phantom, to reveal a diverter chute 20 in position to receive component as it falls through the discharge port 3 from each pocket 11 on the disc, the diverter chute conveying component into the blending apparatus through a blender chute 4. In this position, the diverter chute conveys component for subsequent consumption by the utilization equipment.

Figure 4:
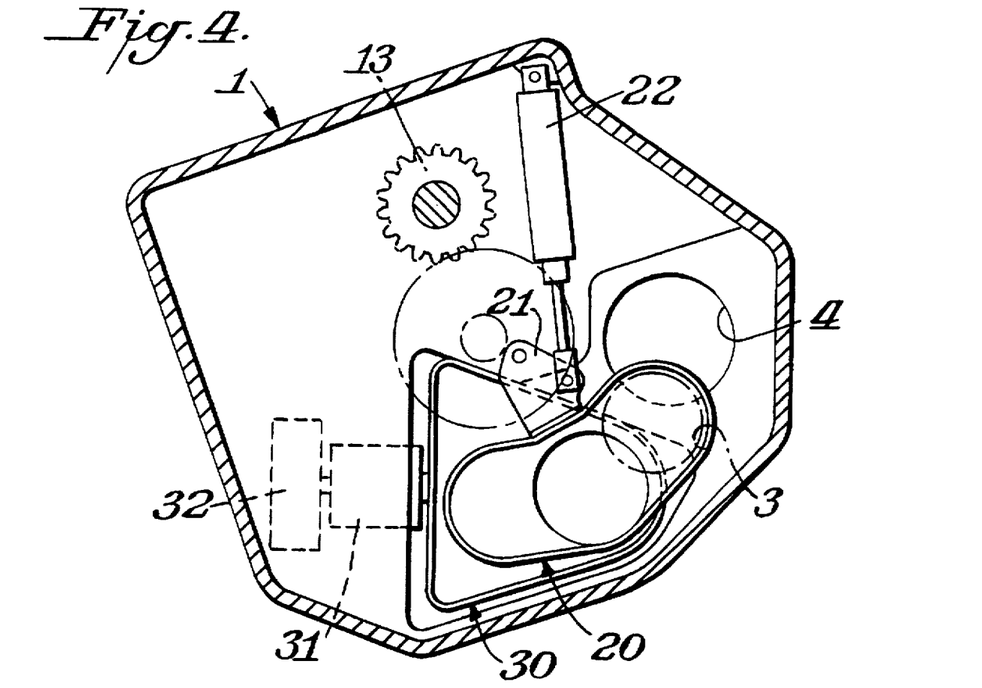
FIG. 4 is a top plan view of FIG. 3 with the disc removed and the diverter chute in an alternate position for diverting component into the collection vessel.

In FIG. 4, a top plan view of an apparatus of the invention, the disc has been removed to more clearly show the operation of the diverter chute and collection vessel 30. In FIG. 4, the diverter chute has pivoted to its alternate position, urged into that position by the motion of the pivot arm and motor 22 acting on the pivoting bracket 21, the pivoting bracket being attached to the diverter chute and the feeding apparatus. According to the process of the present invention, the diverter chute has automatically pivoted to divert additive, in integral increments or pockets of the disc metering element, during a pause in the demand for the component being dispensed by the feeder. In this alternate position, the quantities of component from the disc fall through the discharge port and into the receiving aperture of the chute. When the chute is in this alternate position, the symmetrical orientation of the receiving aperture in relation to the discharge port assures that the component falls down a path through the chute that mirrors the path the component would take if the chute were in position to dispense component to the utilization equipment. The chute is rotated on an axis to each alternate position, and this arcuate movement is reflected in the configuration of the receiving aperture of the chute, which is substantially defined by the movement of a circle along an arc, thus assuring the symmetry of the path the component follows regardless of the position of the chute, and allowing for a more compact configuration of the chute within the feeding apparatus.

In FIG. 4, as the component falls through the chute, it is deposited into the narrower receiving end of the collection vessel 30. The parabolic shape of the collection vessel, with the assistance of gravitational forces acting on the component, urges the component to slide downwardly and outwardly into the increasingly wider and deeper rear end of the collection vessel, assuring a more even dispersion of the diverted component. The fact that the configuration of the collection vessel assists in an even dispersion of the diverted component increases the accuracy of subsequent weighing of the diverted component. Once a sufficient quantity of component has been collected in the vessel, the component is weighed by load cell 31, operatively connected to the vessel. After the load cell has determined the weight of the component, the vessel and load cell are rotated 180° by a motor 32 to discharge the component. The parabolic shape of the collection vessel allows it to rotate in a compact space, and permits directed discharge of the component, without flinging it or spilling it.

Figure 5:
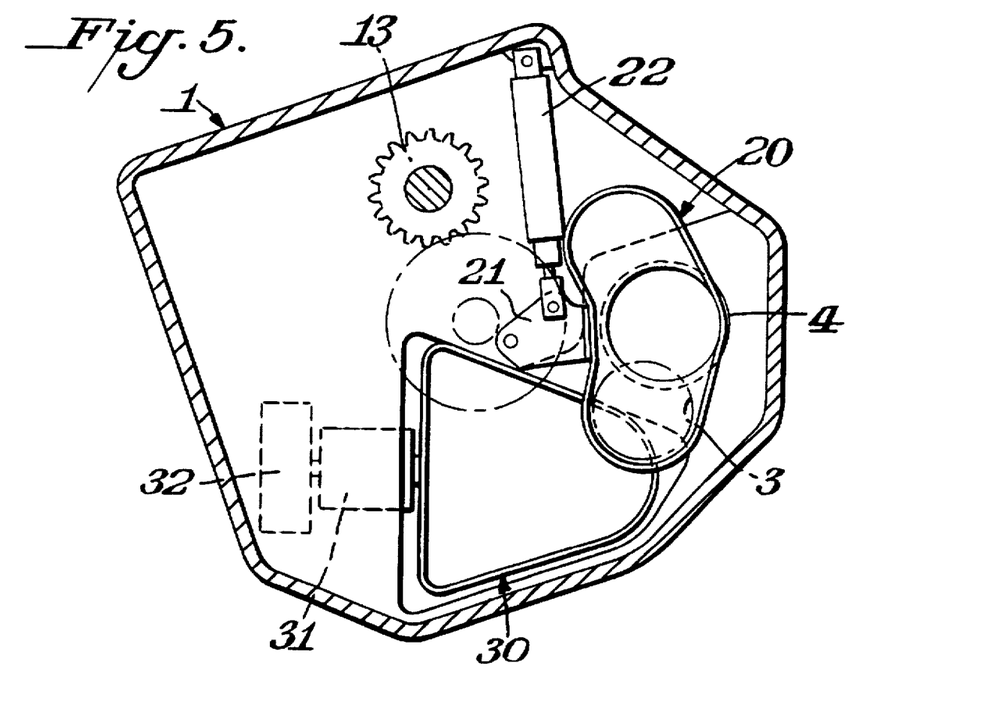
FIG. 5 is a top plan view of FIG. 4 with the diverter chute in a position to convey component to a blending apparatus.

In FIG. 5, the diverter chute has returned to a position to deliver component to the blending apparatus for subsequent consumption by the utilization equipment.

Figure 6A:
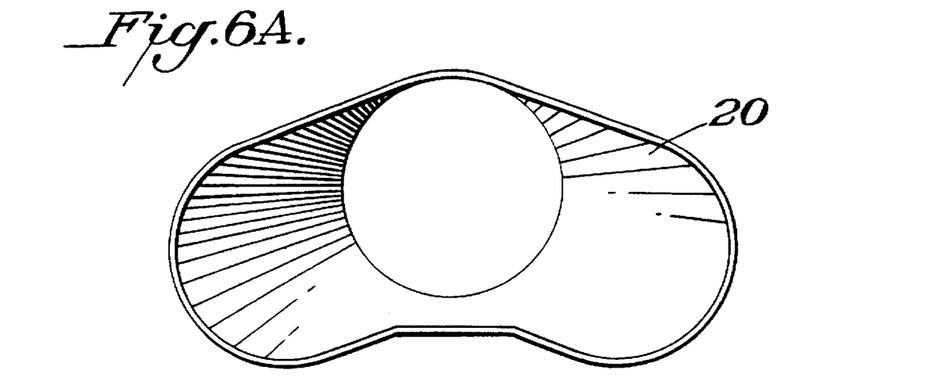
FIG. 6A is a top plan view of a diverter chute of the apparatus of the present invention.
Figure 6B:
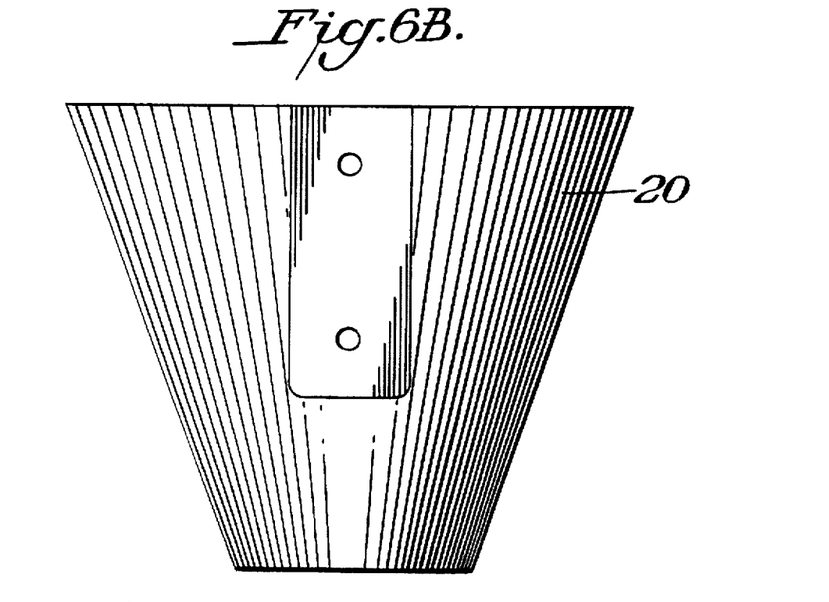
FIG. 6B is a side elevational view of a diverter chute of FIG. 6A.
Figure 6C:
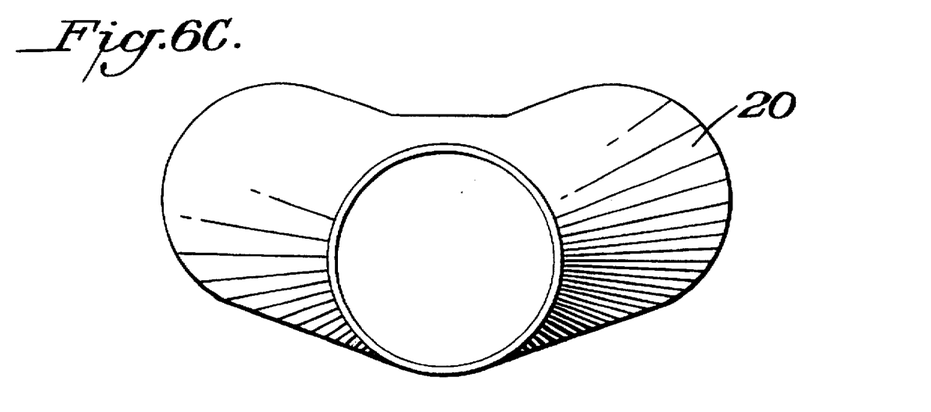
FIG. 6C is a bottom plan view of a diverter chute of FIG. 6A.

FIGS. 6A through 6C show one preferred embodiment of a diverter chute of the apparatus of the present invention. FIG. 6A shows the chute from the top looking down into the receiving aperture and through the dispensing aperture. The receiving aperture, substantially in the shape of a circle rotated about an arc, is designed to be symmetric in relation to the discharge port when the chute is in either alternate position. The narrower dispensing aperture is designed to focus the stream of falling component and direct it into the blender chute or the collection vessel. FIG. 6B shows the chute from a side elevational view, while FIG. 6C shows the chute from the bottom looking into the dispensing aperture.

Figures 7A, 7B, 7C:
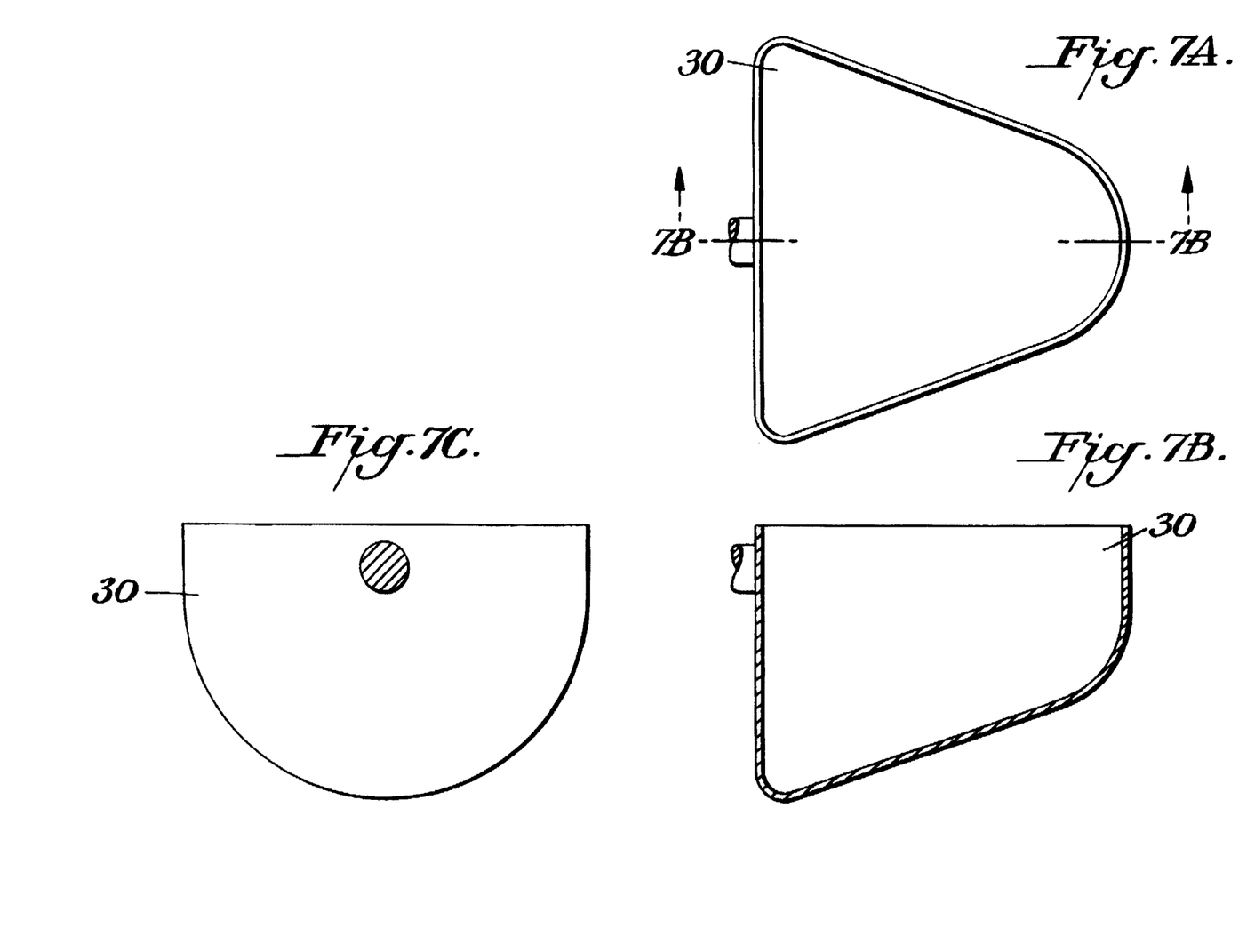
FIG. 7A is a top plan view of a collection vessel of the present invention.
FIG. 7B is a cross section of a collection vessel of FIG. 7A.
FIG. 7C is a rear elevational view of a collection vessel of FIG. 7A.

FIGS. 7A through 7C show one preferred embodiment of a collection vessel of the apparatus of the present invention. The collection vessel is substantially horizontally oriented and has a shape defined by the intersection of a parabola rotated 360° about its axis to form a paraboloid and a plane perpendicular to the axis, the paraboloid being bisected by a plane formed by the axis of the parabola to form a cup with narrower receiving end at the tip of the parabola, and a substantially vertical mounting base formed by the plane perpendicular to the axis of the parabola. FIG. 7A is a top plan view of the collection vessel, while FIG. 7B is a cross sectional view, and FIG. 7C is a rear elevational view of the vessel.

Figure 8:
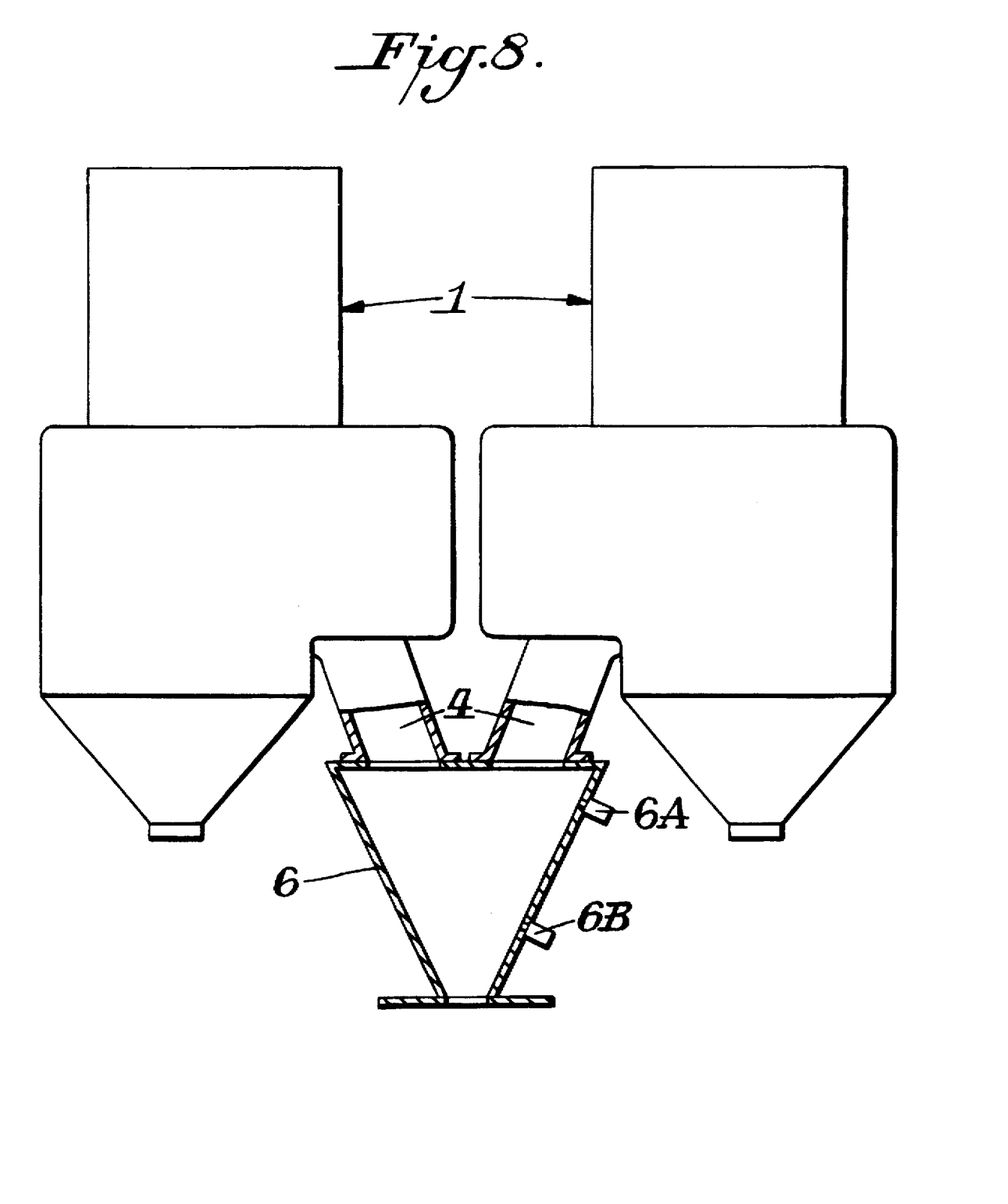
FIG. 8 is a side elevational view of an alternate embodiment of an apparatus of the present invention having two feeders and a surge hopper.

FIG. 8 shows an alternate embodiment of an apparatus of the present invention comprising two feeders operatively connected to a blending apparatus 6. In FIG. 8, the blending apparatus 6 is a surge hopper having high and low level sensors, 6A, and 6B, respectively, and can be operatively connected to extrusion utilization equipment, not shown. In the alternative, the blending apparatus of FIG. 8 can also be used with injection molding utilization equipment, also not shown. In either configuration, the time available for diversion according to the process of the present invention is a function of the time which elapses during which the blended material in the surge hopper is reduced from the high level to the low level.

The process and apparatus of the present invention provide a desirable combination of advantages. Specifically, the present invention facilitates a more efficient and accurate operation of generic materials feeding systems, by providing a means to automatically calibrate during operation, eliminating down time previously required for calibration, and reducing potential waste of raw materials by eliminating the opportunity for operator error. In addition, the present invention further increases the efficiency of the utilization process by basing its calibration calculations on the weight of samples taken periodically and intermittently in integrally measured units, thus accounting and compensating for operational variations over time.

By eliminating the period during which operation is suspended for calibration, the present invention reduces production costs and increases daily output by increasing the time of operation. In addition, the risk of operator error in sampling, weighing, entering data, calculating, and finally calibrating is another disadvantage of interrupting operation for calibration, and has been eliminated by the present invention. The present invention provides a process and apparatus for automatic self calibration of a feeding apparatus without requiring interruption of the operation of the utilization equipment.

The apparatus of the present invention provides a means for automatic calibration or recalibration without interruption of the utilization equipment, and in addition, the diverter chute and collection vessel of the invention provide further advantages. The diverter chute, as a result of the shape of its receiving aperture, requires very little pivotal motion to reach its alternate position, and divert component into the collection vessel. The collection vessel is configured to aid in the even dispersion of component within the vessel. As component falls from the chute, it slides down the walls of the vessel and into the wider end of the vessel furthest from the receiving end. This allows for even dispersion of the component and results in more accurate weighing. In addition, the load cell is attached to the vessel, and when they are rotated to discharge the component after it has been weighed, the load cell can be recalibrated based on its weight when empty, as compared to the negative value of its weight when the vessel is empty and rotated.

I claim:

1. In a process for admixing, at a predetermined ratio, at least two components in a blending apparatus, the blending apparatus being operatively connected to and receiving component from at least one feeding apparatus at a determined rate and passing the resulting blend to utilization equipment, the improvement comprising automatic, intermittent, periodic calibration of the feeding apparatus while the utilization equipment continues to operate by:

(A) defining integral units of operation of the feeding apparatus;
   (B) determining the time periods during which the feeding apparatus is not required to dispense its component, during which periods the utilization equipment continues to operate;
   (C) diverting, in integral increments corresponding to the integral units of operation, quantities of component to a collection vessel, the diversion occurring during time periods determined in (B) above;
   (D) collecting the diverted component until it is at least equal to a predetermined minimum weight required for accurate measurement;
   (E) weighing the diverted component;
   (F) calculating the amount by weight of diverted component dispensed by the feeding apparatus per integral unit of operation, and determining, from the known rate of operation of the feeding apparatus, the rate at which the component is being dispensed by the feeder, in terms of amount by weight over time, and;
   (G) adjusting the rate of operation of the feeding apparatus so that the component is dispensed by the feeding apparatus at the rate required to maintain the predetermined ratio, given the rate of consumption of the particular utilization equipment.

2. A process of claim 1 wherein the utilization equipment comprises an injection molding machine having a screw to inject blended materials into a mold, and component is diverted, in integral units of operation of the feeding apparatus, between the time periods during which the injection molding machine screw recovers for a subsequent injection operation.

3. A process of claim 1 wherein the utilization equipment comprises an injection molding machine, the blending apparatus is a surge hopper having high and low level sensing means to determine when material fed into the hopper has reached a determined high or low level, the sensing means being operatively connected to at least two feeding apparatus to activate each feeding apparatus at the low level and stop it at the high level, the surge hopper being fed by at least two feeding apparatus at a combined, constant rate higher than the average rate at which the blended material is consumed by the injection molding machine, and wherein each component is diverted, in integral units of operation of the feeding apparatus, during the time period which elapses when the material level in the surge hopper is reduced from the high level to the low level as the material is consumed by the injection molding machine.

4. A process of claim 1 wherein the utilization equipment comprises an extrusion machine, the blending apparatus is a surge hopper having high and low level sensing means to determine when material fed into the hopper has reached a determined high or low level, the sensing means being operatively connected to at least two feeding apparatus to activate each feeding apparatus at the low level and stop it at the high level, the surge hopper being fed by at least two feeding apparatus at a combined constant rate higher than the rate at which material is consumed by the extrusion machine, and wherein each component is diverted, in integral units of operation of the feeding apparatus, during the time period which elapses when the material level in the surge hopper is reduced from the high level to the low level as the material is consumed by the extrusion machine.

5. In an apparatus for admixing, at a predetermined ratio, at least two components in a blending apparatus, the blending apparatus being operatively connected to and receiving component from at least one feeding apparatus at a determined rate and passing the resulting blend to utilization equipment, the improvement for automatic, intermittent, periodic calibration of the feeding apparatus while the utilization equipment continues to operate comprising:

(A) means for defining integral units of operation of the feeding apparatus;

(B) means for determining the time periods during which the feeding apparatus is not required to dispense its component, during which periods the utilization equipment continues to operate;

(C) means for diverting, in integral increments corresponding to the integral units of operation, quantities of component to a collection vessel, the diversion occurring during time periods determined in (B) above;

(D) means for collecting the diverted component until it is at least equal to a predetermined minimum weight required for accurate measurement;

(E) means for weighing the diverted component;

(F) means for calculating the amount by weight of diverted component dispensed by the feeding apparatus per integral unit of operation, and determining, from the known rate of operation of the feeding apparatus, the rate at which the component is being dispensed by the feeder, in terms of amount by weight over time, and;

(G) means for adjusting the rate of operation of the feeding apparatus so that the component is dispensed by the feeding apparatus at the rate required to maintain the predetermined ratio, given the rate of consumption of the particular utilization equipment.

6. An apparatus of claim 5 wherein the feeding apparatus is a rotary feeder.

7. An apparatus of claim 5 wherein the rotary feeder is a disc feeder comprising a substantially horizontal rotating disc having pockets, the pockets being integral units of operation of the feeding apparatus.

8. An apparatus of claim 5 wherein the feeding apparatus is a rotary feeder comprising a rotating drum having pockets, the pockets being integral units of operation of the feeding apparatus.

9. An apparatus of claim 5 wherein the rotary feeder is an auger, wherein one unit of rotation of the auger is equal to one integral unit of operation of the feeding apparatus.

10. An apparatus of claim 5 wherein the means for collecting diverted component is a substantially horizontally oriented collection vessel having a shape that is substantially defined by the intersection of a parabola rotated 360° about its axis to form a paraboloid and a plane perpendicular to the axis, the paraboloid being bisected by a plane formed by the axis of the parabola to form a cup with narrower receiving end at the tip of the parabola, and a substantially vertical mounting base formed by the plane perpendicular to the axis of the parabola.

11. An apparatus of claim 9 wherein the collection vessel rotates about its own substantially horizontal axis.

12. An apparatus of claim 5 wherein the weighing means comprises a load cell operatively connected to the collection vessel.

13. An apparatus of claim 11 wherein the collection vessel and load cell rotate together.

14. An apparatus of claim 5 wherein the means for diverting quantities of component comprises a substantially vertically oriented chute having a receiving aperture at the top, and a smaller dispensing aperture at the bottom, the perimeter of the receiving aperture having a shape substantially defined by the movement of a circle along an arc.

15. An apparatus of claim 13 wherein the chute is mounted to pivot about a vertical axis to a position to alternately connect the dispensing aperture to the receiving end of the collection vessel and to the blending apparatus.

16. An apparatus of claim 13 wherein the dispensing aperture of the chute is smaller in diameter than receiving end of the collection vessel.

17. An apparatus of claim 5 further comprising means for commanding the feeding apparatus to divert, dispense, collect, and weigh component when the feeding apparatus is inactive for a period at least equal to one integral unit of operation of the feeding apparatus plus the time necessary for the feeding apparatus to stop dispensing the component, the time for the component to fall from the chute, the time for the chute to be pivoted to its alternate position, the time for the feeding apparatus to begin diverting, the time for the diverted component to fall from the chute, the time for the feeding apparatus to stop, the time for the chute to pivot back to its dispensing position, and any time otherwise necessary to return the feeding apparatus to a ready to dispense mode.

* * * * *